(No Model.) 2 Sheets—Sheet 1.
F. SERVUS.
PHOTOGRAPHIC SHUTTER.
No. 473,356. Patented Apr. 19, 1892.
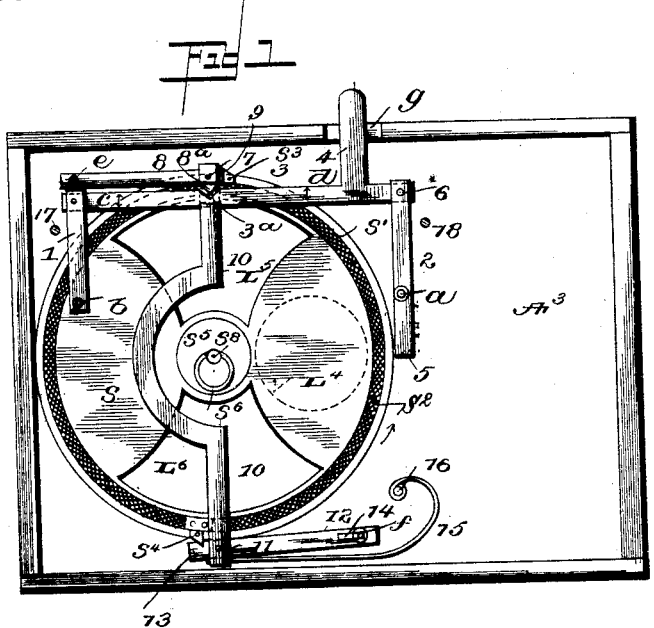
Witnesses
John Imirie
Dennis Sumby
Inventor
Ferdinand Servus.
By his Attorney
James L. Norris.
THE NORRIS PETERS CO., PHOTO-LITHO., WASHINGTON, D. C.

(No Model.) 2 Sheets—Sheet 2.
F. SERVUS.
PHOTOGRAPHIC SHUTTER.
No. 473,356. Patented Apr. 19, 1892.
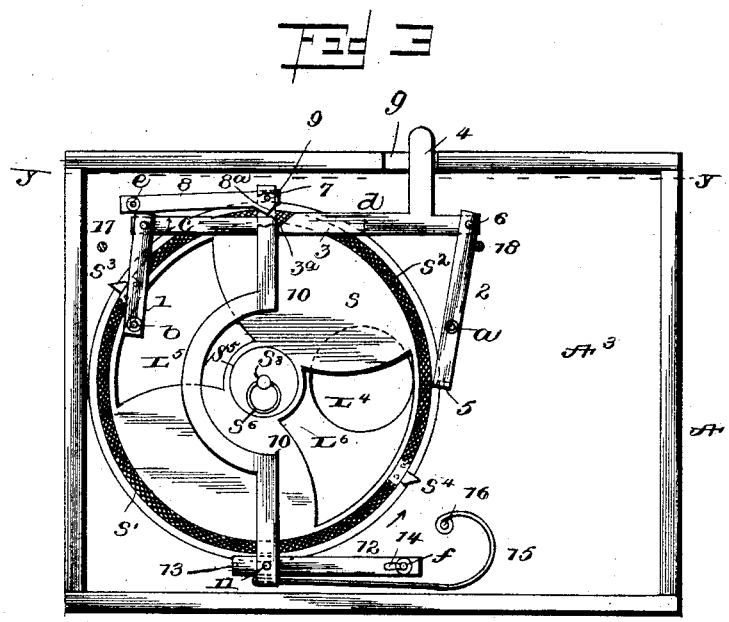
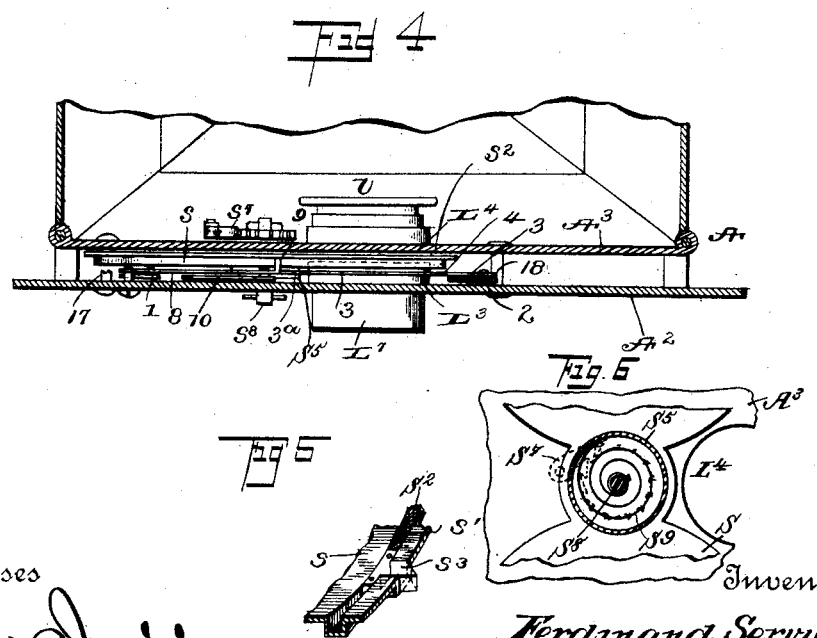
Witnesses
John Imirie
Dennis Sumby
Inventor
Ferdinand Servus.
By his Attorney
James L. Norris

UNITED STATES PATENT OFFICE.

FERDINAND SERVUS, OF BERLIN, GERMANY.

PHOTOGRAPHIC SHUTTER.

SPECIFICATION forming part of Letters Patent No. 473,356, dated April 19, 1892.

Application filed September 13, 1890. Serial No. 364,911. (No model.)

*To all whom it may concern:*

Be it known that I, FERDINAND SERVUS, a subject of the Emperor of Germany, residing at Berlin, Prussia, German Empire, have invented certain new and useful Improvements in Shutter Mechanisms for Cameras, of which the following is a full, clear, and exact specification.

This invention has for its object to provide a new and improved shutter mechanism for a photographic camera whereby time and instantaneous exposures can be made at the will of the operator.

The invention consists in the features of construction and the combination or arrangement of devices hereinafter described and claimed, reference being made to the accompanying drawings, in which—

Figure 1 is an elevation showing my improved shutter mechanism applied to a camera, the parts being in normal position. Figs. 2 and 3 are similar views showing the shutter in different positions. Fig. 4 is a sectional view taken on the line $y\,y$, Fig. 3. Fig. 5 is a detail view showing a portion of the rotary shutter, and Fig. 6 is a detail vertical sectional view through the spring-case to illustrate the spring which turns the shutter.

In order to enable those skilled in the art to make and use my invention, I will now describe the same in detail, referring to the drawings, where the letter A indicates the front portion of a camera, which may be of any construction suitable for the conditions required, and therefore is not more fully illustrated in the drawings. The front portion of the camera is preferably constructed with two walls or plates $A^2$ and $A^3$, separated a suitable distance from each other, as in Fig. 4, for a proper arrangement of the shutter between the same; but I do not confine myself to this arrangement.

The two walls of the camera-box are provided with coincident apertures $L^3$ and $L^4$ for the proper arrangement of the cap $L^7$ and the objective $l$, and between the two apertures is arranged the rotary shutter S, which is adapted to turn on its supporting shaft or axle $S^3$, and is provided with two apertures $L^5$ and $L^6$. These apertures are used for instantaneous or time exposures, and for this purpose I employ a novel lever mechanism, hereinafter described.

The shutter S is provided with a central spring-case $S^5$, which turns with the shutter upon the shaft $S^8$, and this shaft is supported by the two walls of the camera-box and is prevented by a ratchet device $S^7$ from turning except in the direction opposite to that in which the spring contained in the spring-case tends to turn the shutter. By means of the ring or handle $S^6$ the spring can be wound up in a manner similar to winding a watch, although the rotary shutter is locked against movement in the opposite direction, as will hereinafter appear. The shaft $S^8$ has its bearing in the walls or plates $A^2$ $A^3$, and its inner end carries the ratchet-wheel of the pawl-and-ratchet device $S^7$. The case $S^5$ is rigidly secured to the shutter S, and the convolute spring $S^9$ is connected at one end with the case and at the other end with the shaft, so that when the shutter is released the spring acts to turn the shutter and case on the shaft in the direction of the arrow, Figs. 1, 2, and 3.

In proximity to its edge the circular shutter S is furnished with an annular groove $S'$, which is only interrupted by the teeth $S^3$ and $S^4$, placed therein. At these points the edge of the shutter is depressed, as represented in Fig. 5, in such manner that openings are produced, into which the teeth fit and where they are secured in any suitable manner. The annular groove $S'$ serves for stiffening the shutter, and especially for the reception of a stuffing material $S^2$—such as chenille wool or the like—in order to exclude light, which may enter the double wall from the aperture $L^4$. In fact, the access of light to the case or box is effectually prevented by the screen $L^7$, which extends to within a short distance of the shutter. The light, therefore, is refracted several times before it can pass the shutter. Moreover, the stuffing material will surely exclude even the weakest light-wave from entering the interior of the camera.

In Fig. 1 the shutter S and the stop mechanism are shown in the position in which they remain when the apparatus is not in use. The two combined lever mechanisms must be distinguished from each other. The first comprises the three levers 1, 2, and 3. The levers 1 and 2 are fixed with their pivots $a$ and $b$ to the front wall or plate $A^2$, while their upper ends are connected by the lever 3. This lever has in its middle a triangular notch $3^a$ and is on one side $c$ narrower than on the other side $d$. The lever 3 is carried by the levers 1 and 2 and can be moved to and fro through the medium of the handle 4, which extends upward through the camera box or frame A. On pushing the handle 4, Fig. 1, to the left an instantaneous exposure is given, while for a long exposure the lever must be pushed to the right. In the latter case the stop-nose 5, arranged on the lower end of the lever 2, is thrown into the path of one of the teeth of the shutter.

The second lever mechanism comprises the three levers 8 10 12, of which the two levers 8 and 12 are pivoted at one of their ends, at $e$ and $f$, to the front plate $A^2$, and their other two ends are positively connected at 7 and 11 by the intermediate lever 10. The latter is arched or bent laterally at its middle, so that it extends round the spring-case $S^5$, thus saving space. The spring-case determines the distance between the two plates $A^2$ and $A^3$, and all the levers are between the shutter S and the plate $A^2$, the levers 8, 3, and 12 being in one plane and the levers 1, 10, and 2 being in a different plane. The annular groove $S^7$ as a projection on the shutter S does not protrude as far as the spring-case $S^5$, and does not, therefore, interfere with the action of the levers, which are made of very thin sheet metal.

The levers 8 and 12 are provided with the noses 9 and 13, respectively. At the end of the lever 8 is, moreover, provided the tongue $8^a$, which, in the position shown in Fig. 1, fits into the notch $3^a$ in the lever 3. In this case the nose 9 bears against the tooth $S^3$ and prevents the turning of the shutter. By raising the lever 12 it can pass to a position in which it can lock—that is to say, stop one of the teeth $S^3$ $S^4$. Then, however, the upper tooth is released. One of the stop-pawls 9 or 13, therefore, always serves alternately for the stopping operation, and the levers 8 and 12 are connected with each other by the lever 10 in such manner that one tooth is never out of engagement until the other is in position to stop the shutter. Provision has, however, been made for a lateral movement of the lever 12, inasmuch as owing to the slot 14 it can be displaced on the pivot $f$. The spring 15, fixed at one end to the pin 16 and at the other end to the lever 10, has for its object to pull the lever 10 downward and at the same time force the lever 12 to the extreme position to the left in Fig. 1. When the lever 10 now raises the lever 12 and the nose 13, the latter takes not before but behind the tooth $S^4$. As simultaneously with the engagement of the lower stop nose or pawl 13 in the lifting of the lever 10, as described, the upper tooth 9 will be disengaged, the consequence is that the shutter S will move forward through half a revolution. The lower pin or projection 11 then catches the tooth $S^3$ and the latter exerts pressure upon the lever 12, so that this lever is forced back against the action of the spring 15. This position is shown in Fig. 2. By reason of the wound-up spring in the spring-case $S^5$ the rotary motion of the shutter occurs very rapidly, the shutter-apertures passing momentarily between the apertures $L^3$ $L^4$, so that an instantaneous exposure is obtained.

The action just described takes places when through the medium of the handle 4 the lever 3 is pushed to the left, Fig. 2, whereby the notch $3^a$ causes a suitable upward movement of the tongue $8^a$ and an instantaneous exposure is obtained. The lever 3 returns automatically to its original position as soon as the handle 4 is released. For this purpose the inclined surface is made of such a length (the lever being broader at $d$ than at $c$) and the lateral motion of the lever is such that the tooth $8^a$ will continue to be guided on the inclined surface. In consequence of this the spring 15, which continually acts on the lower end of the lever 10 to pull it downward with the tongue $8^a$, can by means of the latter move the lever 3 back again to its original position. Under these conditions the stop pin or nose 9, which in Fig. 2 is disengaged, will pass in front of the tooth $S^4$ before the stop-nose 13 has released the tooth $S^3$. As soon as this has taken place the lever 12 returns to the position shown in Fig. 1, whereupon the next exposure can be given.

For long exposures the lever 3 is moved by means of its handle 4 to the other side, or to the right in Fig. 3, and the action of the levers 8, 10, and 12, as described, is then substantially repeated; but the levers remain in their position, inasmuch as the tongue $8^a$ has lost its guide upon the inclined surface, and the spring 15 cannot now move it downward. Furthermore, the nose 5 is now ready for action. In fact, it is ready for stopping the shutter before the latter is released. In consequence of this the shutter S can only make a quarter of a revolution before the tooth $S^4$ strikes against the pawl 5. In Fig. 3 the aperture $L^6$ is in this manner caused to pass in front of the aperture $L^4$, and a long exposure now takes place. After this exposure the handle 4 is pushed back. Then the slide performs the next quarter of a revolution and the aperture $L^4$ is again closed. The levers have now returned to the position shown in Fig. 1 and are ready for the next exposure. The movement of the lever 3 is limited by the pins 17 and 18; but this may, however, be effected by the ends of the slot $g$ in the frame A, wherein the handle 4 is placed.

An important object is accomplished by the spring 15. It has to pull the lever 10 downward, and serves for taking up the impact of the teeth against the cross-pin 11 and for moving back the lever 12 each time after the tooth has been caught. The manner in which the nose or pin 9 is provided on the lever 8 will be understood from Fig. 4, which shows the said lever in plan view. In like manner the noses or pawls 5 and 13 are arranged on the levers 2 and 12. The noses or pawls are shown in dotted lines, as they are behind the levers.

Having thus described my invention, what I claim is—

1. The combination, with a spring-actuated rotary shutter having peripheral stop-teeth, of a bottom lever 12, having a stop nose or pawl 13, a lengthwise-movable lever 3, a lever 2, operated by the lengthwise-movable lever and having a stop nose or pawl 5, a vertical lever connected with the bottom lever, a lever 8, having a stop-pin 9 and connected with the vertical lever, and means for lifting the vertical lever by the action of the lengthwise-movable lever, substantially as described.

2. The combination, with a rotary shutter having peripheral stop-teeth, of a central shaft or axle $S^8$, on which the shutter loosely turns, a spring-case attached to the shutter and turning therewith on the central shaft or axle, a ratchet device $S^7$, a bottom lever 12, having a stop nose or pawl 13, a lengthwise-movable lever 3, a lever 2, operated by the lengthwise-movable lever and having a stop nose or pawl 5, a vertical lever 10, connected with the bottom lever, a lever 8, having a stop-pin 9 and connected with the vertical lever, and means for lifting the vertical lever by the action of the lengthwise-movable lever, substantially as described.

3. The combination, with a camera-frame, of a rotary shutter having an annular channel in proximity to its periphery, which contains a packing material for excluding light, substantially as described.

4. The combination, with a camera-frame, of a rotary sheet-metal shutter struck up with an annular channel in proximity to its periphery and containing a soft packing or filling for excluding light, substantially as described.

5. The combination, with a rotary shutter having stop-teeth at its periphery, of the bottom lever 12, having a stop nose or pawl 13, the pivoted vertical levers 1 and 2, the horizontally-movable lever 3, having its ends pivoted, respectively, to the vertical levers, the top lever 8, having a stop-pin 9 and provided with a lever connection with the bottom lever, and means for actuating the top and bottom levers by the action of the horizontally-movable lever, substantially as described.

6. The combination, with a rotary shutter having stop-teeth at its periphery, of a bottom lever 12, having a stop nose or pawl 13, a pivoted lever 2, having a stop nose or pawl 5, a lengthwise-movable lever having an angular notch $3^a$, a top lever 8, having a stop 9, and a vertical lever 10, connecting the top and bottom levers and having an angular projection $8^a$, acted on by the angular notch of the lengthwise-movable lever, substantially as described.

7. The combination, with a rotary shutter having stop-teeth at its periphery, of the sliding and pivoted bottom lever 12, having a stop nose or pawl 13, the pivoted vertical levers 1 and 2, the stop-pins 17 and 18 for limiting the swinging movements of the vertical levers, a horizontally-movable lever 3, having its ends pivoted, respectively, to the said vertical levers, a top lever 8, having a stop 9, a lever connecting the top and bottom levers, and means for operating the said connecting-lever by the action of the horizontally-movable lever, substantially as described.

8. The combination, with a rotary shutter having stop-teeth $S^3$ $S^4$ arranged diametrically opposite each other, of the three levers 2, 8, and 12, a connection between the levers 8 and 12, and means for swinging the lever 2 and operating the connection between the levers 8 and 12, substantially as described.

In testimony whereof I affix my signature in presence of two witnesses.

FERDINAND SERVUS.

Witnesses:
I. LEMAN,
A. SIEBER.